Aug. 30, 1932.  D. H. SPICER  1,874,375
AUTOMATIC TIRE INFLATER
Filed Feb. 18, 1930   2 Sheets-Sheet 1
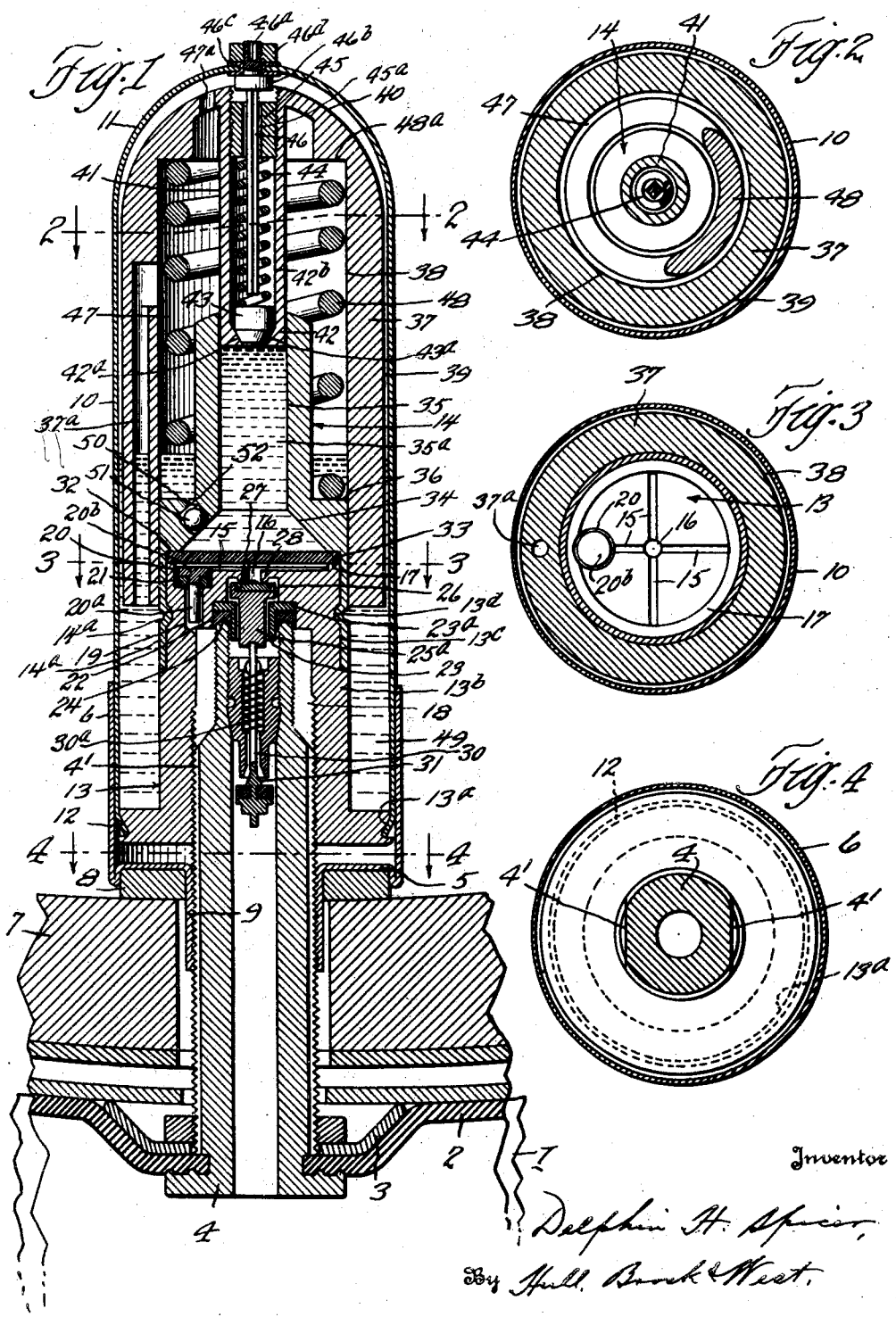

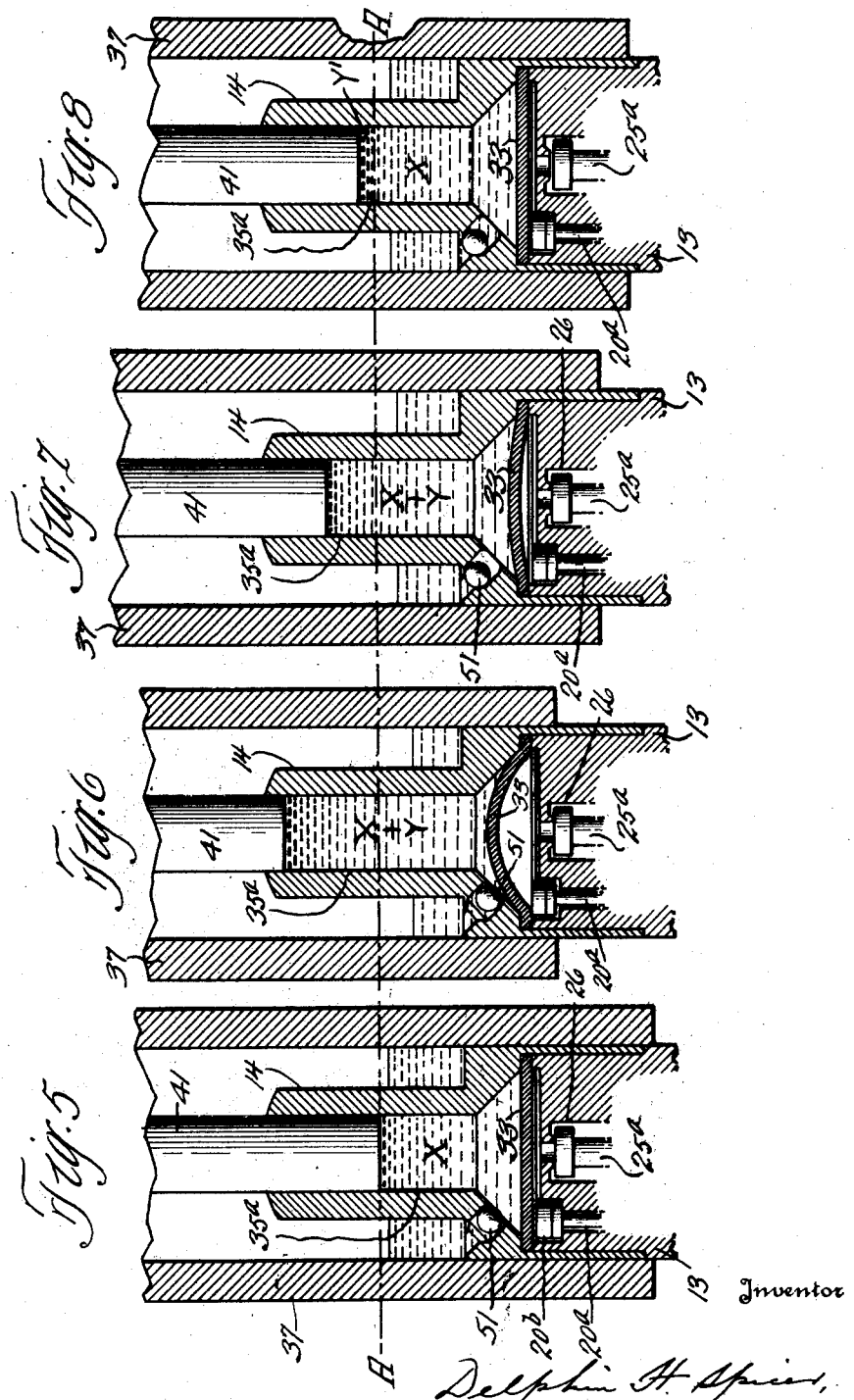

Patented Aug. 30, 1932

1,874,375

UNITED STATES PATENT OFFICE

DELPHIN H. SPICER OF LAKEWOOD, OHIO, ASSIGNOR TO SPICER AIRFLATER, INC., OF CLEVELAND, OHIO, A CORPORATION OF OHIO

AUTOMATIC TIRE INFLATER

Application filed February 18, 1930. Serial No. 429,256.

This invention relates to automatically operating tire inflaters of the type which are adapted for attachment to the valve stems of automobile tires and, under all ordinary conditions, for maintaining fully inflated the tires to which they are so attached.

It is the general purpose and object of the invention to provide a device of this character which will accomplish the purpose for which it is intended in an efficient manner; which may be conveniently applied to the valve stems of tires with which automobiles are regularly equipped without any alteration in such stems or in the valves with which they are equipped; also to provide a device of this character which will be operative, irrespective of the rate of speed, by vibrations due to irregularities in the roads traveled, even where such irregularities are no larger than those which characterize so-called good roads; also to provide a device of this character which, while capable of securing the foregoing results, is of such small size and weight as to adapt it to standard wheel construction. Further and more limited objects of the invention will appear hereinafter and will be realized in and through the construction and arrangement of parts shown in the drawings, wherein Fig. 1 represents a central longitudinal sectional view through a device embodying my invention, showing associated therewith a fragment of the felly, rim and tire; Figs. 2, 3 and 4 are transverse sectional views corresponding respectively to the lines 2—2, 3—3 and 4—4 of Fig. 1; and Figs. 5-8 inclusive are sectional diagrammatic views showing a complete pumping cycle.

Describing the various parts by reference characters, 1 denotes the outer casing of an ordinary pneumatic tire within which there is arranged the usual inner tube 2 having the valve stem spreader 3 and valve stem 4. This valve stem is of the usual construction, having its opposite sides flattened off as shown at 4', whereby channels for air will be afforded between the same and the surrounding portion of the pump or inflater when the latter is attached thereto.

The inflater comprises a cylindrical base casing 5 having an upwardly projecting annular recess 6 in the bottom thereof between which and the felly 7 there is interposed a packing ring 8, fitting snugly about an inner hub portion 9 which is threaded onto the valve stem. The casing 5 receives therewithin the lower end of an upper casing 10, the latter casing being cylindrical throughout its extent with the exception of the top 11, which is shown as spherical. The lower end of the casing 10 is flanged inwardly, as shown at 12, into a tapered seat 13ª provided adjacent to the bottom of a coupling member 13, which coupling member is threaded onto the valve stem.

The coupling member comprises a base portion having the seat 13ª and a reduced cylindrical inner or upper portion 13ᵇ, the upper or inner end of the cylindrical portion being further reduced, as shown at 13ᶜ, for the reception of a cylindrical sleeve 14ª constituting an extension of the hollow cylindrical member 14. The sleeve 14ª may be secured to the upper portion of the coupling member 13, 13ᶜ by pressing a portion of such sleeve inwardly to provide an inwardly extending rib 14ᵇ which is seated in a corresponding annular groove 13ᵈ on the coupling member. The upper end of the coupling member is provided with grooves 15 extending radially outwardly from a central opening 16, the outer ends of the grooves terminating within the periphery of the top of said member and below an annular seat 17 extending inwardly from such periphery.

It will be noted that an annular chamber 18 is provided between the upper portion of the valve stem and the surrounding portion of the coupling member 13. From one side of this chamber a port 19 extends upwardly into a chamber 20 having therein packing material 21, preferably soft rubber, surrounding the upper end of the port and the stem 20ª of the valve 20ᵇ, the upper end of the chamber communicating with the compression chamber A provided within the peripheral seat 17.

The head portion of the coupling member is also provided with a short cylindrical chamber 22 extending upwardly from the chamber 18 and having therein a sleeve 23 provided at its upper end with an outwardly extending annular flange 23ª which extends to the wall of the cylindrical chamber 22 and between which flange and the top of the valve stem 4, packing material 24, also preferably soft rubber, is inserted, to form a seal at this place between the inside of the valve stem and the chamber 18.

The sleeve 23 forms a guide for the stem 25ª of a valve the upper end of which is enlarged and is movable within a chamber 26, the enlarged end or valve proper being provided with packing material 27, preferably soft rubber, adapted to engage a downwardly extending tapered valve seat 28 surrounding the central opening 16.

The valve stem 25ª is of such length as to engage the top of the stem 30 of the ordinary "valve insides", thereby to hold the valve 31 unseated while the valve body 27 is held against the seat 28 by the action of the spring 30ª of the "valve insides".

Above the upper end of the sleeve 14ª, the cylinder 14 is provided with an inwardly extending annular shoulder 32, between which and the annular seat 17 the peripheral portion of a piston or diaphragm 33 is clamped, said diaphragm forming one of the walls of the chamber A. This diaphragm may be of rubber or other suitable material. Above the shoulder 32, the interior of the cylinder 14 is provided with a frusto-conical surface 34, and, above such surface with a cylindrical inner wall 35. At the base of the cylindrical portion 14, an annular seat 36 is provided, for a purpose to be specified hereinafter.

Slidably mounted on the lower portion of the cylinder 14 is a weight 37. This weight has an inner cylindrical surface 38 extending from the bottom nearly to the top thereof and an outer cylindrical surface 39, merging at its top with a spherical surface 40—the exterior of the weight conforming in shape to the interior of the casing 10, 11, and being of sufficiently smaller diameter than the said casing to move freely therewithin. This weight is provided with a central cylindrical sleeve 41, preferably integral therewith and extending downwardly into the top of the cylinder 35. The bottom of the sleeve 41 is normally closed by a valve, whereby the sleeve with the valve constitute a piston or plunger 42, which plunger moves within the cylinder 35 toward and from the head of the coupling member 13. The bottom of the plunger is provided with a central opening from which an outwardly and upwardly flaring valve seat 42ª extends to the inner wall 42ᵇ of the sleeve. 43 denotes a valve having a tapered seat 43ª adapted to engage the seat 42ª. This valve is normally held to its seat by means of a spring 44 bearing at its lower end upon the top of the valve and at its upper end against a nut 45 which is threaded into the upper ends of the weight 37 and sleeve 41, the nut being provided with an angular bore 45ª. For the purpose of adjusting the nut in the valve, thereby to vary the compression of the spring 44, I provide means associated with the nut whereby it may be turned from the exterior of the casing 11. The means shown herein comprises a stem 46 which is angular in cross section, corresponding to the shape of the bore of the nut, and which extends through the top of the casing, where it is provided with a socket 46ª for the reception of a suitable tool for rotating. Within the casing, the stem is provided with a disk 46ᵇ which engages the inner portion of a channeled packing ring 46ᶜ which surrounds the portion of the stem above the disk and extending through the casing. The outer end of the stem is provided with a thread for the reception of a nut 46ᵈ. In operation, the nut 45 may be moved toward and from the valve 43 by rotating the stem 46 in the appropriate direction. Prior to such rotation, the nut 46ᵈ will be backed off a short distance and can be held with a wrench, or otherwise, while the stem is being rotated by the appropriate tool after which the nut will be screwed downwardly on the stem to compact the packing 46ᶜ between it and the head 46ᵈ.

A port 47ª in the top of the weight member 37 provides a vent for air to the chamber 47, formed within the weight and the bottom of which chamber surrounds the cylinder 14. Within the said chamber is a helical spring 48 which engages with its upper end a seat 48ª in the top of the chamber and the shoulder 36 with its lower end, thereby tending to hold the weight 37 in the elevated position shown in Fig. 1.

The chamber provided between the lower portion of the casing 10 and the coupling member 13 is filled with a suitable liquid, as indicated at 49; and the weight is provided with a port 37ª which extends upwardly from the bottom thereof and communicates at its upper end with the chamber 47. The liquid 49 extends upwardly and around the bottom of the weight 37 to a point considerably above the shoulder 36, the port 37ª providing means whereby, on a movement of the weight 37 toward the felly, liquid may be supplied to the chamber 47 thereby insuring the presence in said chamber of liquid above the shoulder 36. This shoulder is provided with a port 50 which communicates at its upper end with the liquid in the chamber 47 and at its lower end with the frusto-conical portion of the liquid-containing space of the cylinder 14, the port being controlled by a ball check 51 which, on compression of the liquid below the plunger 42, will be forced to a seat 52.

The purpose of the spring 48 is to balance the centrifugal force exerted by the weight 37 at different wheel speeds, and the spring is so wound that its initial or expanded compression strength is equal to the centrifugal force exerted by the weight at such predetermined wheel speed as is deemed proper to start the weight on its outward travel, and of a final or compressed strength equal to the centrifugal force to be exerted by the weight at the predetermined final or maximum wheel speed deemed proper or expedient for the operation of the pump. This maximum and minimum compression strength of the spring may be readily determined by Trautwine's formula for centrifugal force, which involves the mass of the weight 37, the radius of the center of gravity of the weight in feet, and the square of the revolutions per minute of the wheel. Of course, it is evident that the initial and final operating speeds for the weight can be varied as desired.

With the parts constructed and arranged as described, the operation will be as follows:—The valve 31 being unseated by the stem 25$^a$, air from the tire cannot escape because of the engagement of the valve packing 27 with the seat 28, the pressure of the air in the tire and the spring 30$^a$ holding the said valve packing to its seat. As the vehicle to which the pump is attached is driven, the weight will move gradually toward the rim, compressing the spring 48, and at a certain speed will assume a balanced position, determined by such speed and the resistance of the spring, this position being due to the centrifugal action created by and due to such speed and the balancing effect of the spring. Its movement outwardly will be gradual, due not only to the spring 48, but to the dash pot which is provided between the bottom of the plunger 42 and the cylinder 35, the outward movement of the weight and plunger displacing liquid from the chamber 35$^a$ within the cylinder 35 into the chamber 47 surrounding the said cylinder. During this movement, the check valve 51 will, of course, be seated.

Assuming that the vehicle is travelling at a certain speed—say 40 miles per hour—the weight will take an outward position due to and in accordance with such speed and the resistance of the spring 48, and will hold this position until such time as the tire may encounter an obstacle or an irregularity in the road. If the pump be above the axle at such time, there will be a movement of the coupling 13 and the cylinder 14 outwardly (toward the rim) with reference to the weight 37, resulting in expanding the spring 48 to some extent and temporarily destroying the balance which has heretofore been established between the spring and the weight due to centrifugal action. This movement of the plunger away from the head of the coupling member draws the central portion of the diaphragm 33 inwardly; but, as the movement of the diaphragm does not diminish the capacity of the cylinder 35 as much as the inward movement of the plunger 42 increases such capacity, it follows that liquid will be drawn into the interior of the cylinder through the port 50, thereby maintaining the cylinder completely filled with liquid and assuring immediate and unbroken transmission of pressure from the plunger, through the liquid filling the cylinder, to the diaphragm as soon as the weight 37 is started on its outward movement, due to centrifugal action.

Concurrently with the outward movement of the parts 13 and 14, air will be drawn through the chamber 20 into the compression chamber A. The outward movement of the weight and plunger (due to centrifugal action) will force the diaphragm to its seat, at the same time delivering air from the chamber A past the valve 27 and into the tire.

The action described will be repeated whenever the relative positions of the weight and of the coupling member are changed, whether produced by variations in car speed or by irregularities in the road bed; and this pumping action will occur even though the irregularities are comparatively slight, air being drawn into and expelled from the chamber A by movements of the diaphragm as slight as $\frac{1}{16}$ inch. This sensitiveness of operation is largely due to the fact that the cylinder 35 is at all times filled with liquid, which maintains a variable but unbroken extension of the plunger; the metallic plunger, with its oil extension, is always ready to produce a suction and a compression stroke upon the diaphragm 33 upon relative movements between the weight and the coupling member, causing increase and decrease in the capacity of the chamber provided between the top of the coupling member 13 and the plunger.

To restate the action in different form: At any given speed (maintained for a sufficient time) a balance is created between the weight under centrifugal force and the spring 48 which, if disturbed even in a slight degree by change of speed or by irregularity of the road, creates a motion which will produce a pumping action and, no matter how slight the vibration or stroke resulting therefrom, air will be forced into the tire.

Reference has been made hereinbefore to the valve 43. This serves as a pre-determined maximum pressure relief valve. By suitable adjustment of the nut 45, the spring 44 may be placed under such compression as to prevent the valve from opening until the pressure on the liquid in the chamber 35 has reached a predetermined amount corresponding to the desired maximum pressure in the tire, the pressure in the chamber 35 exceeding the desired pressure in the tire by the effort required to unseat the valve 27. When the valve 43 is thus unseated, liquid can pass through the plunger 41 into the reservoir in the casing 10.

Reference has also been made to the provision of grooves 15. These grooves provide for the delivery of any air that may be present in the chamber A should the center of the diaphragm seat in advance of the exterior portion thereof on the compression stroke.

It should be noted further that, when running under ordinary conditions, the diaphragm always occupies its compression position; and its position is varied only by the tire encountering an irregularity in the road which will result in a movement of the weight and plunger toward the hub of the wheel, which movement will draw the central portion of the diaphragm a slight distance in the same direction and at the same time serve to replenish any liquid that may have been exhausted from the chamber 35ᵃ and insure an immediate pumping stroke of the diaphragm as soon as the weight and its plunger shall move toward the rim.

The operation of the pump during any complete cycle will probably be better understood by reference to Figs. 5 to 8 inclusive, which show somewhat diagrammatically the relative positions of the plunger and diaphragm and the variable volume of the liquid extension of the plunger during such cycle. Fig. 5 shows the plunger, the diaphragm, and the liquid column, the volume of which is indicated by X, when the parts are in equilibrium; that is to say, when the weight and plunger shall have assumed the positions due to a sustained speed of say 40 miles an hour.

Fig. 6 shows the positions of said parts at the end of a suction stroke of the plunger, caused by an irregularity of the road or pavement. It will be noted that the diaphragm 33 is flexed away from the coupling member 13 so that the compression chamber is filled with air and the volume of the liquid extension of the plunger has been increased by the amount of liquid Y drawn in through the valve 51.

In Fig. 7 the parts are shown in the positions which they occupy when, under the influence of centrifugal action, the weight and plunger shall have been moved outwardly a sufficient distance to nearly seat the diaphragm 33, compressing the air in the chamber therebeneath to a considerable extent but not quite sufficient to open the valve 27. It will be noted that the volume of the liquid extension of the plunger is still represented by $X+Y$; in other words, this liquid extension of the plunger has served to transmit immediately to the diaphragm the pressure due to the outward movement of the plunger under centrifugal action and at the same time some of the liquid has been displaced around the plunger thereby to retard the plunger in reaching its final position due to such action.

It will be noted that the diaphragm 33 in this view is nearly seated and that only a slight further movement of the plunger is needed to seat the diaphragm and expel the air from the compression chamber.

In Fig. 8 the parts are shown in the positions which they occupy when the diaphragm has been seated, thereby expelling the air from the compression chamber into the tire; but the outward movement of the plunger by centrifugal action is still being retarded by the amount of the liquid Y′ which has not yet been displaced but which, under further movement of the plunger due to centrifugal action will pass around the plunger and enable the latter to regain the position shown in Fig. 5.

In these views, the volume of liquid in Figs. 6, 7 and 8 is indicated by the expression $X+Y$, it being understood, of course, that the liquid X which fills the chamber 35ᵃ when the plunger is at the end of its compression stroke and the diaphragm is flattened is mingled with the other liquid; but in Fig. 8, the letter Y′ is applied to the liquid in excess of that necessary to fill the chamber between the flattened diaphragm and the line A—A, which indicates the position of the bottom of the plunger at the beginning of the cycle and at the end of its outward movement under centrifugal action.

Any out-of-balance of the wheel which may be created by attaching the inflater to a valve stem can be overcome by placing a suitable weight on the opposite side of the wheel, in such manner that a true static and dynamic balance will result.

Having thus described my invention, what I claim is:

1. A tire inflater comprising a member, said member having a compression chamber and a passage leading from said chamber and adapted to deliver air therefrom, a valve in said passage and having a stem, a valve in said member for admitting air to said compression chamber, a diaphragm forming a movable wall of said chamber, a liquid-containing cylinder on the opposite side of the diaphragm from the passage, a weight surrounding the said cylinder and having a plunger entering the working chamber thereof for pressing the liquid against the said diaphragm, a spring interposed between the said weight and the said cylinder, and a pressure relief valve in the said plunger.

2. A tire inflater comprising a member, said member having a compression chamber and a passage leading from said chamber and adapted to deliver air therefrom, a valve in said passage, a movable pumping member forming one of the walls of said chamber, the said member having a passage for admitting air to said compression chamber on the suction stroke of said pumping member, a valve for such passage, a liquid-containing cylinder extending from said pumping member, a weight surrounding the said cylinder and having a plunger entering the working chamber thereof for pressing the liquid against the said pumping member, a spring interposed between the said weight and the said cylinder, and a pressure relief valve in the said plunger.

3. A tire inflater comprising a member, said member having a compression chamber and a passage leading from said chamber and adapted to deliver air therefrom, a valve in said passage, a movable pumping member forming one of the walls of said chamber, the said coupling member having a passage for admitting air to said compression chamber on the suction stroke of said pumping member, a valve for such passage, a liquid-containing cylinder extending from said pumping member, a weight surrounding the said cylinder and having a plunger entering the working chamber thereof for pressing the liquid against the said pumping member, and a spring interposed between the said weight and the said cylinder.

4. A tire inflater comprising a member, said member having a compression chamber and a passage leading from said chamber and adapted to deliver air therefrom, a valve in said passage, a movable pumping member forming one of the walls of said chamber, the said coupling member having a passage for admitting air to said compression chamber on the suction stroke of said pumping member, a valve for such passage, a liquid-containing cylinder extending from said pumping member, a weight surrounding the said cylinder and having a plunger entering the working chamber thereof for pressing the liquid against the said pumping member, a spring interposed between the said weight and the said cylinder, the said inflater comprising a liquid containing chamber surrounding the said cylinder, a passage connecting the said chamber with a portion of the working chamber adjacent to the pumping member, and a check valve in the last-mentioned passage.

5. A tire inflater comprising a member, said member having a compression chamber and a passage leading from said chamber and adapted to deliver air therefrom, a valve in said passage, a diaphragm forming the wall of said chamber which is opposite said chamber, there being a passage for admitting air to said chamber on the suction stroke of said diaphragm and a valve for said passage, a liquid-containing cylinder extending from the said diaphragm, a weight surrounding the said cylinder and having a plunger entering the working chamber thereof for pressing the liquid against the said diaphragm, a spring interposed between the said weight and the said cylinder, and a pressure relief valve in the said plunger, the said inflater having a liquid-containing chamber, a passage connecting the said chamber with a portion of the working chamber adjacent to the diaphragm, and a check valve in said passage.

6. A tire inflater comprising in combination a member, the said member having a pumping chamber provided between a fixed wall and a wall movable toward and from the fixed wall, there being a passage leading from said chamber for delivering air therefrom, a weight movable toward the fixed wall by centrifugal action, a spring for opposing such movement, and connections whereby the movement of the weight from such fixed wall will draw air into the chamber and the movement of the weight toward such wall will force air from said chamber and through said passage.

7. A tire inflater comprising in combination a member, the said member having a pumping chamber provided between a fixed wall and a wall movable toward and from the fixed wall, there being a passage leading from said chamber for delivering air therefrom, a weight movable toward the fixed wall by centrifugal action, a spring for opposing such movement, a cylinder extending from said movable wall and away from said chamber, a plunger in said cylinder connected with said weight and movable therewith toward and from said fixed and movable walls, there being liquid in said cylinder, a liquid-containing chamber arranged externally of said cylinder, there being a passage for supplying liquid from said liquid-containing chamber to the cylinder adjacent to said movable wall, and a check-valve in said passage.

8. A tire inflater comprising in combination a member, the said member having a pumping chamber provided on one side thereof with a diaphragm constituting a movable wall and having a passage extending from the opposite side thereof, a cylinder extending from the side of the diaphragm opposite the fixed wall, a plunger in said cylinder, a weight connected with said plunger and movable by centrifugal action toward the fixed wall, a spring for opposing such movement of said weight, the said cylinder containing liquid, and means operative by the movement of the weight and plunger by said spring for replenishing the liquid in said cylinder.

9. A tire inflater comprising in combination a member, the said member having a pumping chamber provided on one side thereof with a diaphragm constituting a movable wall and having a passage extending from the opposite side thereof for delivering air, a cylinder extending from the side of the diaphragm opposite the fixed wall, a plunger in said cylinder, a weight connected with said plunger and movable by centrifugal action toward the fixed wall, and a spring for opposing such movement of said weight, the said cylinder containing liquid.

10. A tire inflater comprising in combination a member, the said member having a pumping chamber provided on one side thereof with a diaphragm constituting a movable wall and having a passage extending from the opposite side thereof for delivering air, a cylinder extending from the side of the diaphragm opposite the fixed wall, a plunger in said cylinder, a weight connected with said plunger and movable by centrifugal action toward the fixed wall, a spring for opposing such movement of said weight, the said cylinder containing liquid, means operative by the movement of the weight and plunger by said spring for replenishing the liquid in said cylinder, and a pressure relief valve in said plunger.

11. A tire inflater comprising in combination a member, the said member comprising a pumping chamber having a fixed wall and a diaphragm movable toward and from the fixed wall, there being a passage leading from the said chamber for delivering air therefrom, a liquid-containing cylinder extending away from the said diaphragm and having one end defined thereby, a plunger in said cylinder, a weight connected with said plunger and movable therewith by centrifugal action toward said fixed wall, a spring opposing such movement, a liquid-containing chamber located externally of said cylinder and arranged to receive liquid passing around said plunger, and means operative by the movement of the plunger away from said pumping chamber for replenishing the liquid in said cylinder.

12. A tire inflater comprising a member, a cylinder connected to and extending from said member and having a liquid-containing working chamber therein, a diaphragm at the bottom of said chamber, said member being provided with a compression chamber beneath the diaphragm, a passage communicating with the said compression chamber and adapted to deliver air therefrom, a valve in said passage, the valve having an extension, valve controlled means for automatically supplying air to the compression chamber on the suction stroke of the diaphragm, a plunger mounted in the working chamber of said cylinder, a weight surrounding the said cylinder and connected with said plunger, and a spring interposed between the said weight and the said cylinder.

13. A tire inflater comprising a member, a cylinder connected to and extending from said member and having a liquid containing working chamber therein, a diaphragm at the bottom of said chamber, said member being provided with a compression chamber beneath the diaphragm, a passage communicating with the said compression chamber and adapted to deliver air therefrom, a valve in said passage, valve controlled means for automatically supplying air to the compression chamber on the suction stroke of the diaphragm, a plunger mounted in the working chamber of said cylinder, a weight connected with said plunger, and a spring for opposing the movement of the weight in one direction.

14. A tire inflater comprising a member, a cylinder extending from said member and having a liquid containing working chamber therein, a diaphragm at the bottom of said chamber, said member being provided with a compression chamber beneath the diaphragm, a passage communicating with the said compression chamber and adapted to deliver air therefrom, a valve in said passage, the valve having an extension, valve controlled means for automatically supplying air to the compression chamber on the suction stroke of the diaphragm, a plunger mounted in the working chamber of said cylinder, a weight surrounding the said cylinder and connected with said plunger, a spring interposed between the said weight and the said cylinder, there being a liquid containing chamber above the bottom of the working chamber, a passage communicating at one end with such chamber and at its other end with a portion of the working chamber adjacent to the diaphragm, and a check valve in the last mentioned passage.

15. A tire inflater including a hollow member, a pair of pistons of different sizes operatively associated with said hollow member and defining therewith a chamber for containing liquid, a weight connected with the smaller piston for operating the same, and pump means operated by the larger piston and forming therewith an air pump for inflating a tire.

16. A tire inflater including a hollow member, a pair of pistons of different sizes operatively associated with said hollow member and defining therewith a chamber for containing liquid, a weight connected with the smaller piston for operating the same, and pump means operated by the larger piston for inflating a tire.

In testimony whereof, I hereunto affix my signature.

DELPHIN H. SPICER.